US008028642B2

(12) United States Patent
Foxcroft

(10) Patent No.: US 8,028,642 B2
(45) Date of Patent: Oct. 4, 2011

(54) WHISTLE WITH FINGER GRIP

(76) Inventor: Ron Foxcroft, Stoney Creek (CA)

( * ) Notice: Subject to any disclaimer, the term of this patent is extended or adjusted under 35 U.S.C. 154(b) by 0 days.

(21) Appl. No.: 12/874,284

(22) Filed: Sep. 2, 2010

(65) Prior Publication Data

US 2011/0214597 A1 Sep. 8, 2011

Related U.S. Application Data

(63) Continuation of application No. 29/357,139, filed on Mar. 8, 2010, now Pat. No. Des. 621,290.

(60) Provisional application No. 61/371,227, filed on Aug. 6, 2010.

(51) Int. Cl.
*G01K 5/00* (2006.01)

(52) U.S. Cl. ................ 116/137 R; 116/140; D10/119.3; 446/206

(58) Field of Classification Search .............. 116/137 R, 116/140; 446/397, 406, 202–204, 206, 26; D10/119; 473/61; D21/681, 684
See application file for complete search history.

(56) References Cited

U.S. PATENT DOCUMENTS 1,688,349 A * 10/1928 Petrie .............................. 446/26
3,120,213 A * 2/1964 Mulligan ...................... 116/280
D244,045 S * 4/1977 Lah et al. ..................... D21/775
4,215,646 A * 8/1980 Williams ........................ 116/70
4,343,490 A * 8/1982 Adamson ...................... 280/821
4,359,961 A * 11/1982 Seron ........................ 116/137 R
4,392,325 A * 7/1983 Woronets ........................ 446/26
4,709,651 A * 12/1987 Lance ........................ 116/137 R
4,821,670 A * 4/1989 Foxcroft et al. ........... 116/137 R
5,086,726 A * 2/1992 Sharp ........................ 116/137 R
5,251,569 A * 10/1993 Seron ........................ 116/137 R
5,318,492 A * 6/1994 Quinn ........................... 482/108
5,495,820 A * 3/1996 Seron ........................ 116/137 R
5,546,887 A * 8/1996 Cameron .................. 116/137 R
5,581,931 A * 12/1996 Swisher ......................... 43/21.2
D399,910 S * 10/1998 Eckmann ..................... D21/682
5,816,186 A * 10/1998 Shepherd .................. 116/137 R
5,847,652 A * 12/1998 Yamamoto ..................... 340/574
D408,062 S * 4/1999 Beard et al. .................. D21/684
5,979,015 A * 11/1999 Tamaribuchi ................ 16/110.1
6,094,780 A * 8/2000 McGlothlin et al. ............ 16/430
6,109,202 A * 8/2000 Topman et al. ........... 116/137 R
D462,917 S * 9/2002 Hills et al. ................... D10/119
6,698,377 B1 * 3/2004 Topman et al. ........... 116/137 R
6,837,177 B2 * 1/2005 Tanaka ...................... 116/137 R
7,010,835 B2 * 3/2006 Tillim ............................. 16/430
D555,529 S * 11/2007 Foxcroft et al. .............. D10/119
D621,290 S * 8/2010 Foxcroft ...................... D10/119
* cited by examiner

*Primary Examiner* — R. A. Smith
*Assistant Examiner* — Tania Courson

(57) ABSTRACT

A whistle for producing resonant frequencies comprising a body which includes a mouth piece having an inlet, and at least two sound chambers to which inlet air is blown from the inlet. The whistle further includes air passageways for communicating inlet air from the inlet to the sound box and sound chambers. The body further includes at least two exhaust ports in communication with the sound chambers for discharging air and sound. The two sound chambers are dimensioned to create peak principal frequencies which interactively produce a pulsating sound having a periodic pulse frequency of less than 100 hertz. The whistle preferably includes air intake ports for communicating additional port air into the sound box.

14 Claims, 15 Drawing Sheets

FIGURE - 5
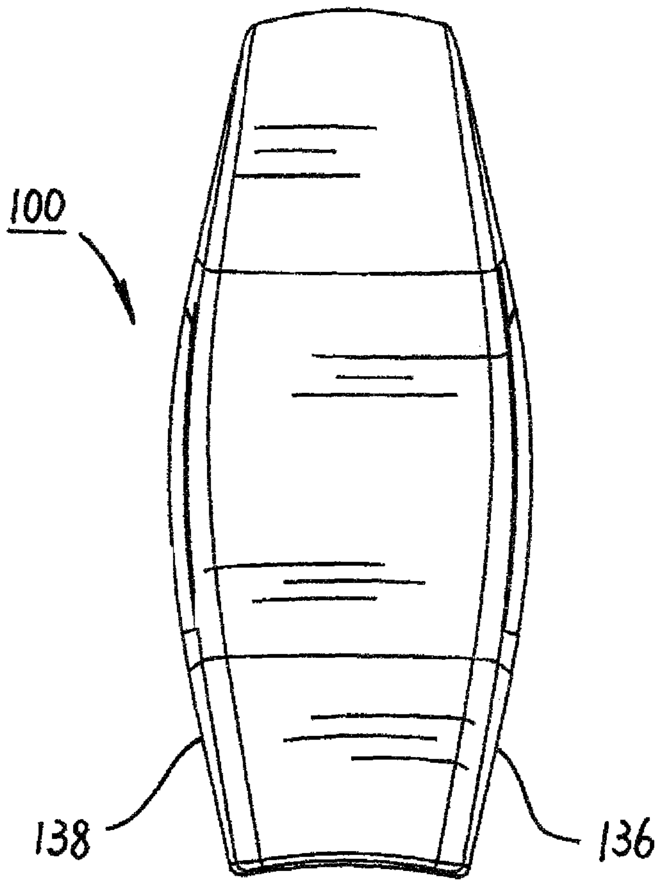
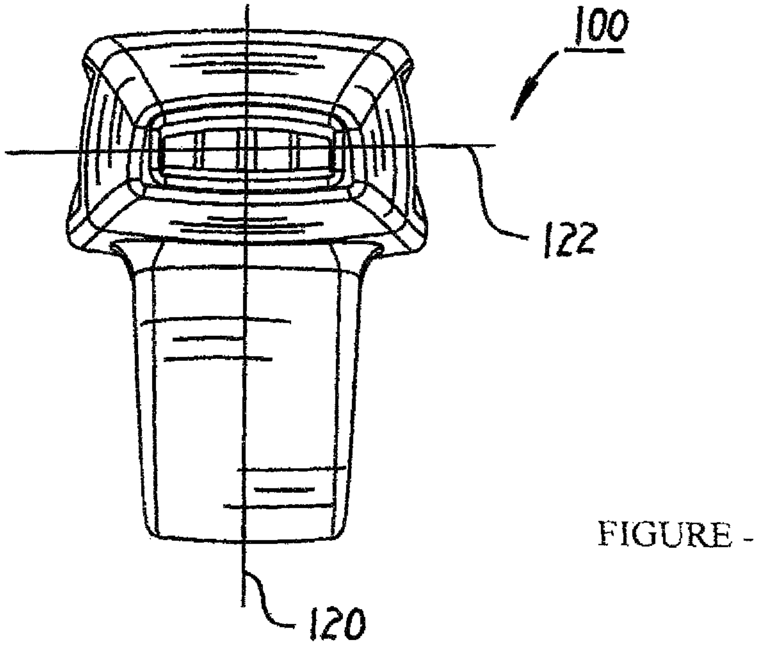
FIGURE - 6

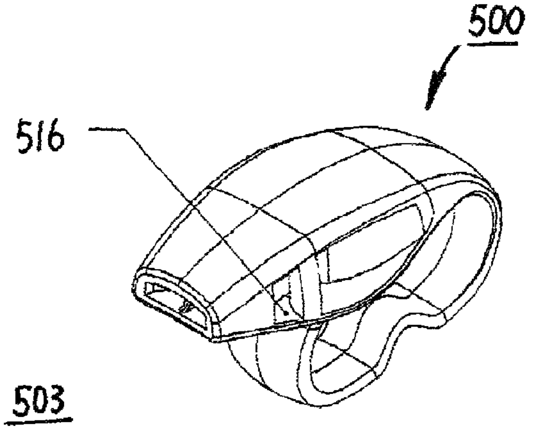
FIGURE 17
FIGURE 18
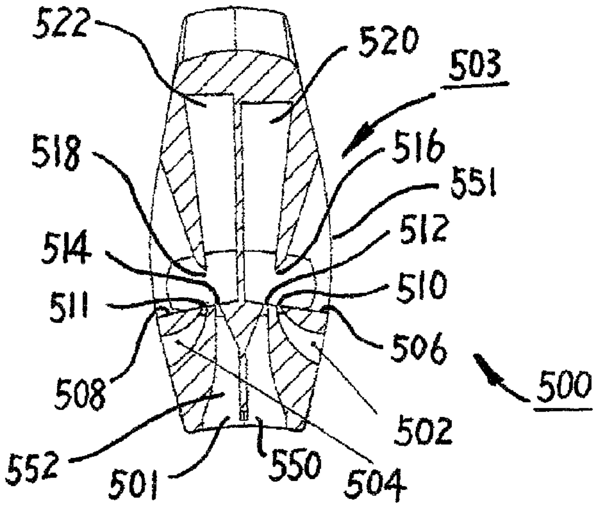
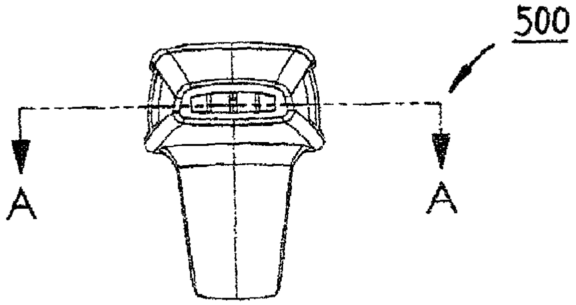
FIGURE 19

WHISTLE WITH FINGER GRIP

This application claims priority from U.S. Design application No. 29/357,139 filed on Mar. 8, 2010 by Ron Foxcroft, under the title: WHISTLE WITH FINGER GRIP and also claims priority from U.S. provisional Application No. 61/371,227 filed Aug. 6, 2010 by Ron Foxcroft under the title: WHISTLE WITH FINGER GRIP

FIELD OF THE INVENTION

The present invention relates to whistles and in particular relates to whistles providing a pre-selected pulsating sound and having a resiliently biased finger grip.

BACKGROUND OF THE INVENTION

Whistles are used for many purposes ranging from use by referees to control sports events to emergency use to attract attention. The required characteristics of whistles depend upon the intended use. For instance a professional referee needs a whistle, which responds reliably to produce a loud noise so that the referee can control a game regardless of crowd noise. In some circumstances such as in emergency situations one wants to have a whistle which produces a very loud piercing sound which will attract the attention of nearby persons that may be able to provide assistance.

In sporting events referees have come to use certain whistles, which produce a certain sound. In many cases the whistles that are being used by referees stem from historical circumstances. The use of a particular type of whistle that produces a certain sound has often become well known to both players and audience of the games alike.

Historically most of these whistles have been pea whistles meaning whistles, which contain a rotating ball within the sound or resonating chamber. More recently however there has been a shift to the use of pea-less whistles, which are whistles which do not include the use of a rotating ball or pea within the resonating and/or sound chamber. The advantages of the pea-less whistle have been discussed in numerous prior art documents including U.S. Pat. No. 5,816,816 and U.S. Pat. No. 4,821,670.

Despite the advantages of the pea-less whistle designs which are currently on the market in many instances they have not been accepted in certain sporting venues due to the differences in the sounds produced by the pea-less whistle and the conventional pea styles whistles. Referees and participants in the sporting events and spectators alike have become accustom to a certain sound which has been broadly accepted within the sporting venue and the whistle which produces that particular sound is the preferred whistle even though the technology within the whistle itself may be less than optimal.

Therefore there is a need for a whistle which can emulate as closely as possible the sound of a pea-whistle using a pea-less design by creating a whistle which is able to emulate the sound of a particular pea-whistle without the disadvantages associated with the pea-design.

In addition referees require a whistle, which is comfortable to grip with ones fingers and reliably produce a constant sound.

U.S. Pat. No. 6,837,177 discusses the possibility of producing a two-chambered whistle wherein the chambers have different resonate frequencies. In particular U.S. Pat. No. 6,837,177 calls for a first chamber having a resonate frequency of 3.4 kilohertz and a second resonate chamber having a resonate frequency of 3.7 kilohertz. This produces a beat frequency of approximately 300 hertz. U.S. Pat. No. 6,837,177 teaches that if the beat frequency is less than 100 hertz the beat is almost negligible with the result that the sound is monotonous. In other words U.S. Pat. No. 6,837,177 is teaching a beat frequency which is at least greater than 100 hertz. U.S. Pat. No. 4,709,651 also discusses the possibility of having a whistle having two sound chambers producing different resonate frequencies. In fact U.S. Pat. No. 4,709,651 teaches that the resonate frequencies of the two sound producing chambers are arranged to produce relatively high and low frequency sounds. In their preferred arrangement the sound range of the whistle namely the two sound producing chambers is such as to substantially cover the upper and lower limits of human hearing. They give the example of the frequency range of the whistle between 2 kilohertz and 8 kilohertz. This patent again teaches a very wide difference in frequencies between the two sound producing chambers namely of the order of 6 kilohertz.

U.S. Pat. No. 5,816,186 also discusses the concept of providing a whistle that produces beats through the arrangement of two resonate frequencies from two separate sound resonating chambers. This patent does not quantify or discuss how to select a certain beat frequency and/or the ability to emulate the sound of a pea-whistle using a pea-less design.

In summary the current art teaches the possibility of having two sound resonating chamber pea-less whistle creating a certain beat frequency which is typically 100 hertz and/or more in order to provide a particular beat.

The present whistle produces a pulse rather than a beat and the inventor has found in practice that it is the pulse sound and not a beat that is required in order to emulate the sound of the existing pea-whistle designs. It has also been found that the introduction of additional air through intake ports helps to emulate the sound of a pea style whistle in a pea less design.

BRIEF DESCRIPTION OF THE DRAWINGS

The whistle will now be described by way of example only with reference to the following drawings in which;

FIG. 5 is a top plan view of the whistle.

FIG. 6 is a front end plan view of the whistle.

FIG. 17 is a top front schematic perspective view of an alternate embodiment of namely whistle 500.

FIG. 18 is a schematic cross sectional view of whistle 500 taken along lines AA of FIG. 19.

FIG. 19 is a schematic partial front elevational view of the alternate embodiment namely whistle 500.

DETAILED DESCRIPTION OF THE PREFERRED EMBODIMENTS

Figure 1:
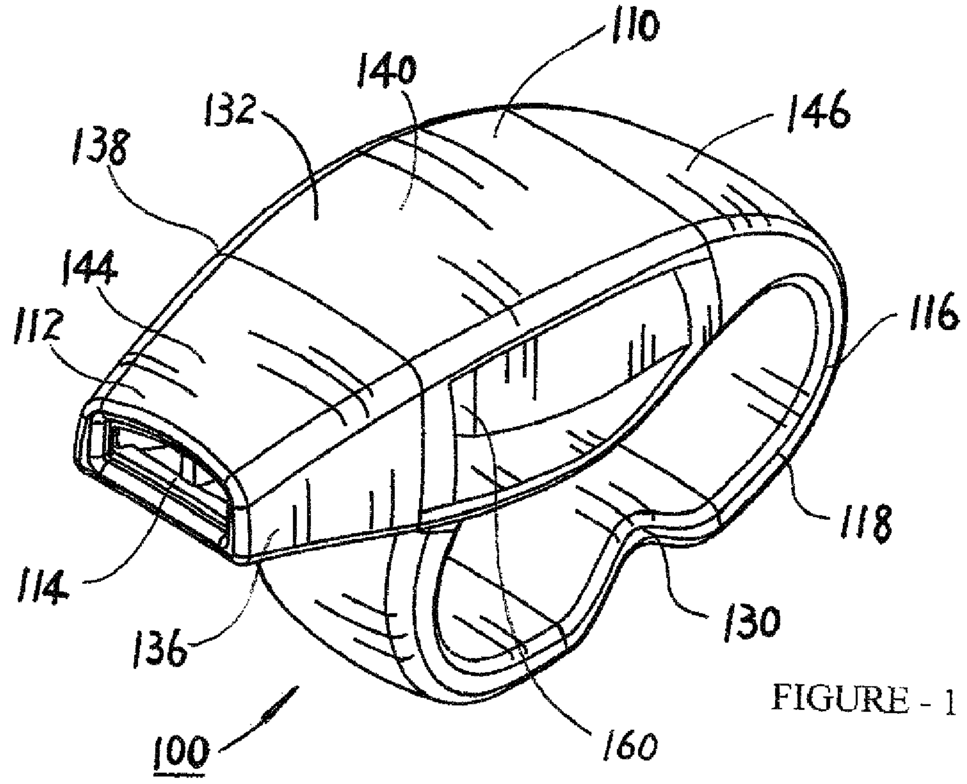
FIG. 1 is a schematic front side perspective view of the whistle.
Figure 2:
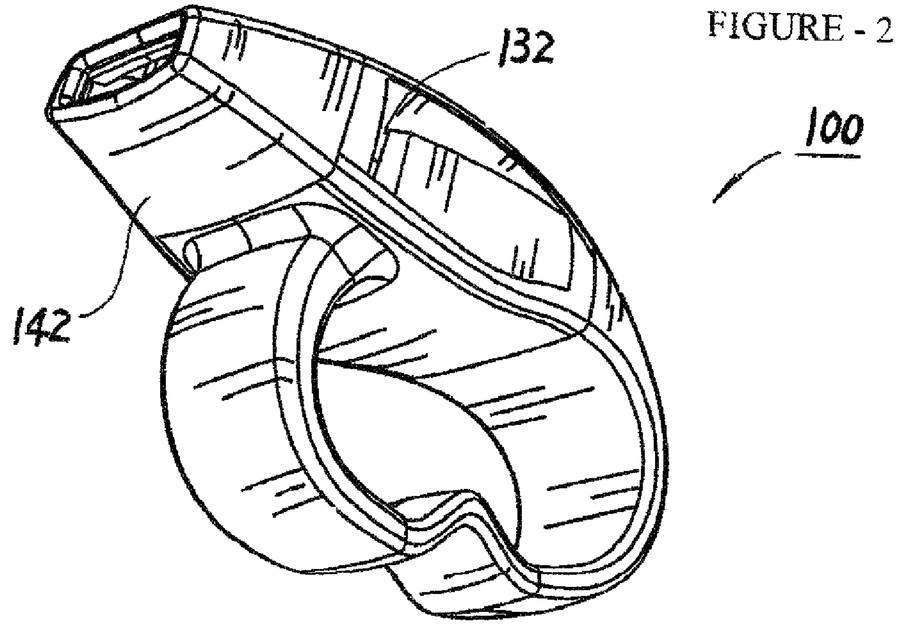
FIG. 2 is a front bottom schematic perspective view of the whistle.
Figure 3:
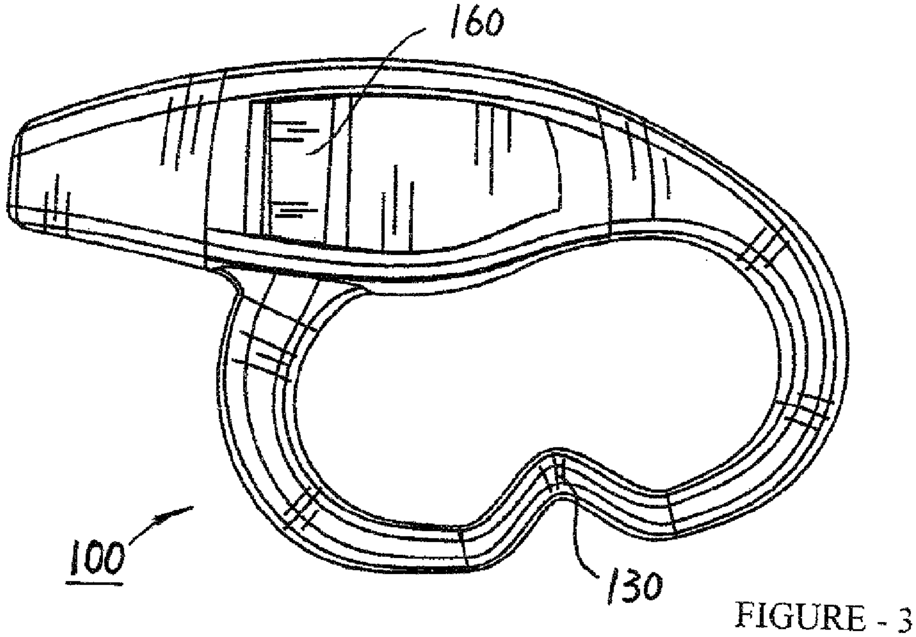
FIG. 3 is the right side elevational view of the whistle.
Figure 4:
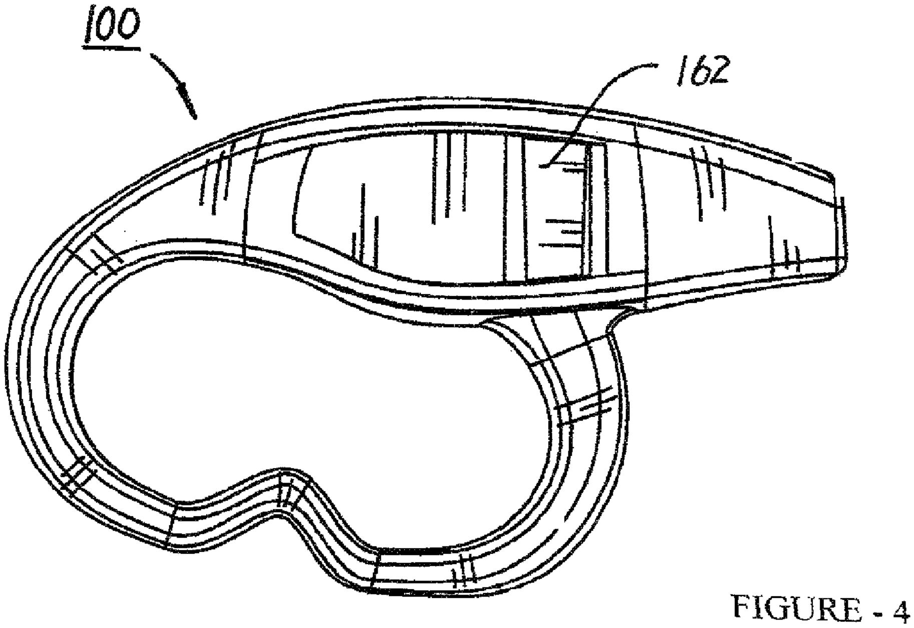
FIG. 4 is a left side elevational view of the whistle.
Figure 7:
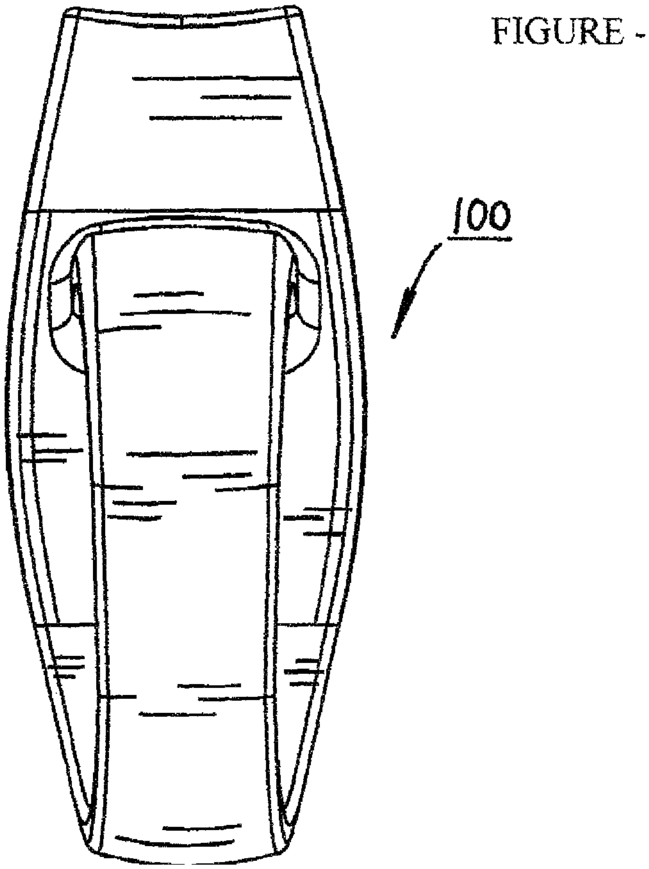
FIG. 7 is a bottom plan view of the whistle.
Figure 8:
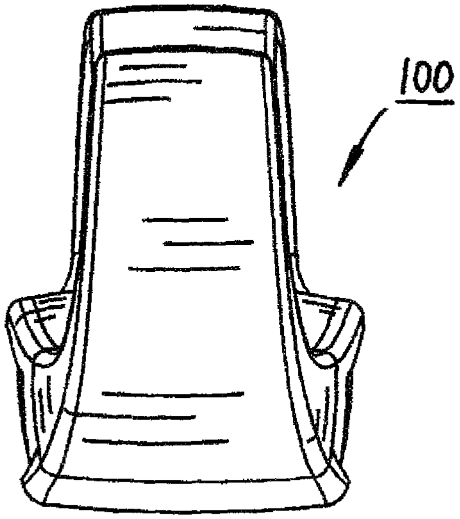
FIG. 8 is a rear end plan view of the whistle.

The present device a whistle shown generally as 100 in the Figures includes the following major components namely a body 110 having a mouthpiece 112, which defines and inlet 114. Whistle 100 further includes a finger grip 116, which is comprised of a finger sleeve 118 and also includes a V-spring 130.

Whistle 100 can be oriented relative to a horizontal plane 122 and a vertical plane 120 as shown in FIG. 6.

Whistle 100 further includes a right exhaust port 160, a left exhaust port 162, a right side 136, a left side 138, a top side 140, a bottom side 142, a front portion 144 and a rear portion 146, a central portion 132 and an exterior surface 151.

Figure 9:
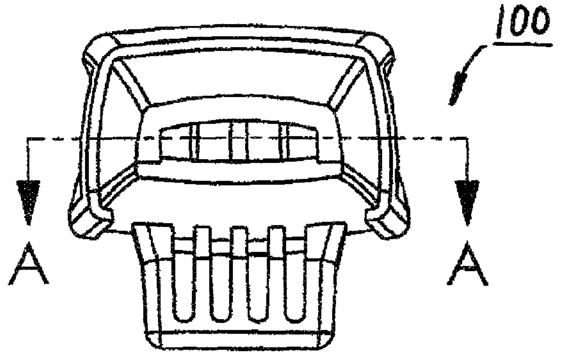
FIG. 9 is a partial front end plan view of the whistle.
Figure 10:
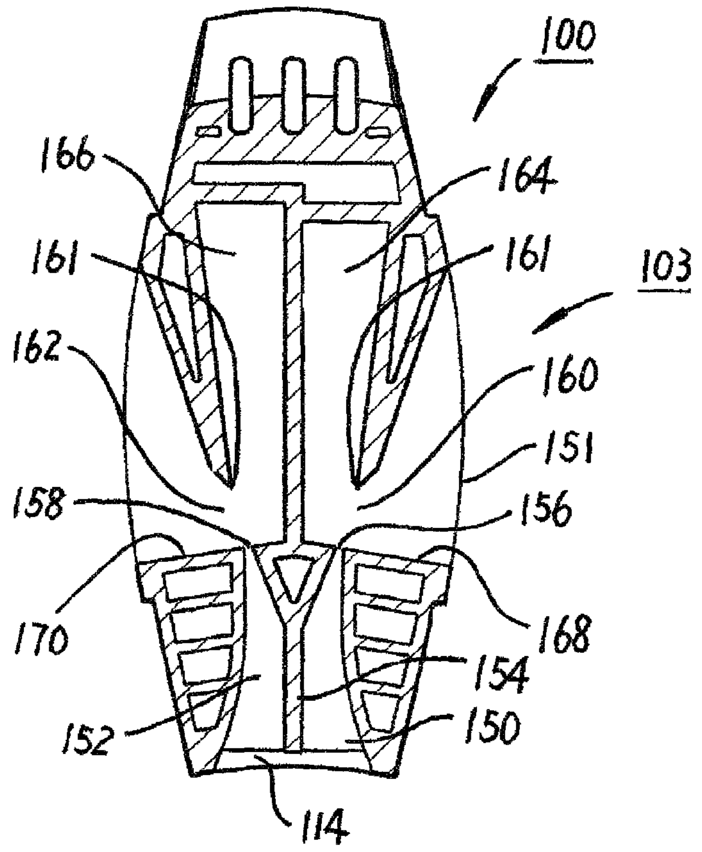
FIG. 10 is a schematic cross sectional view of the whistle taken along lines AA of FIG. 9.

Now referring specifically to FIG. 10, which shows in cross section the whistle 100 along lines A-A of FIG. 9 and includes the following inlet 114 which is divided into a right air passageway 150 and a left air passageway 152 with an air divider 154. Passageways 150 and 152 terminate at right air orifice 156 and left air orifice 158 respectively and direct air into sound box 103. The air blown typically using the mouth through inlet 114 exits through right air orifice 156 and left air orifice 158 into sound box 103 and impinges upon edges 161 and interacts with right sound chamber 164 and left sound chamber 166 and exits through right exhaust port 160 and left exhaust port 162 partially defined by right deflector 168 and left deflector 170.

Figure 11:
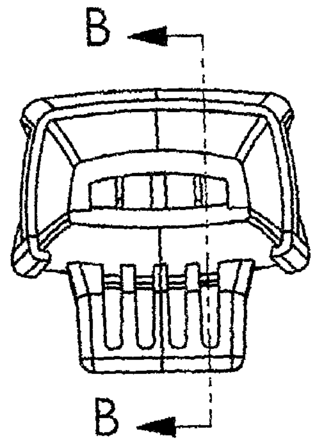
FIG. 11 is a partial schematic front elevational view of the whistle.
Figure 12:
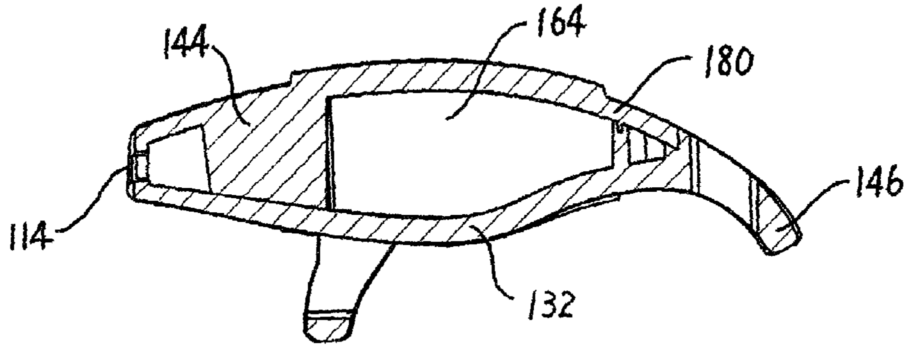
FIG. 12 is a schematic cross sectional view of the whistle taken along lines BB of FIG. 11.

Referring now to FIG. 12 which is a cross sectional view along lines B-B of FIG. 11, the hard plastic components of whistle 100 are shown in FIG. 12 as body core 180.

Figure 14:
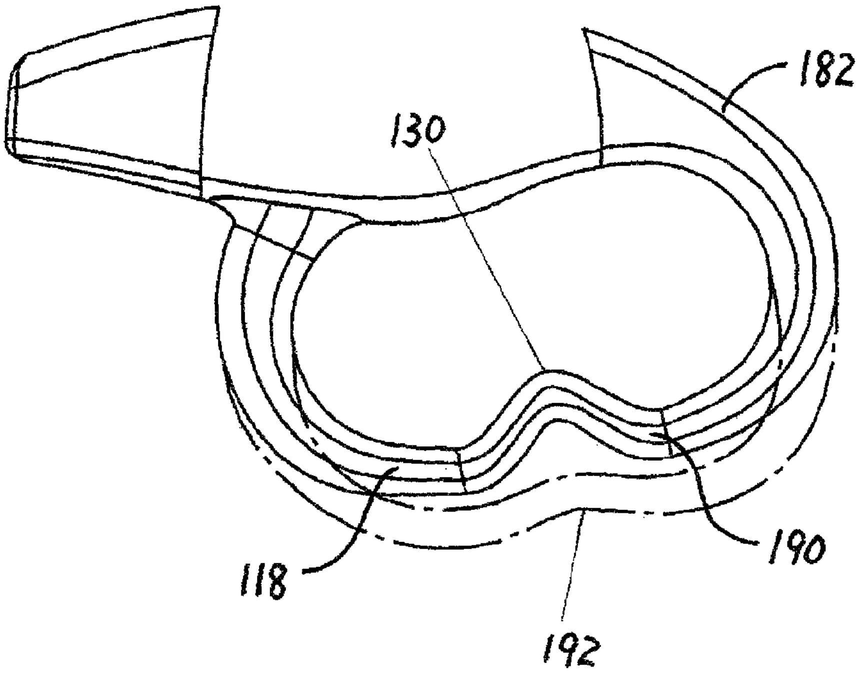
FIG. 14 is a side schematic elevational view of the whistle showing only the rubber overlay portion of the whistle.

In the moulding process the hard plastic components are generally moulded and assembled to form body core 180 and thereafter a rubber overlay as shown as 182 in FIG. 14 is moulded over top of the hard plastic body core 180.

Figure 13:
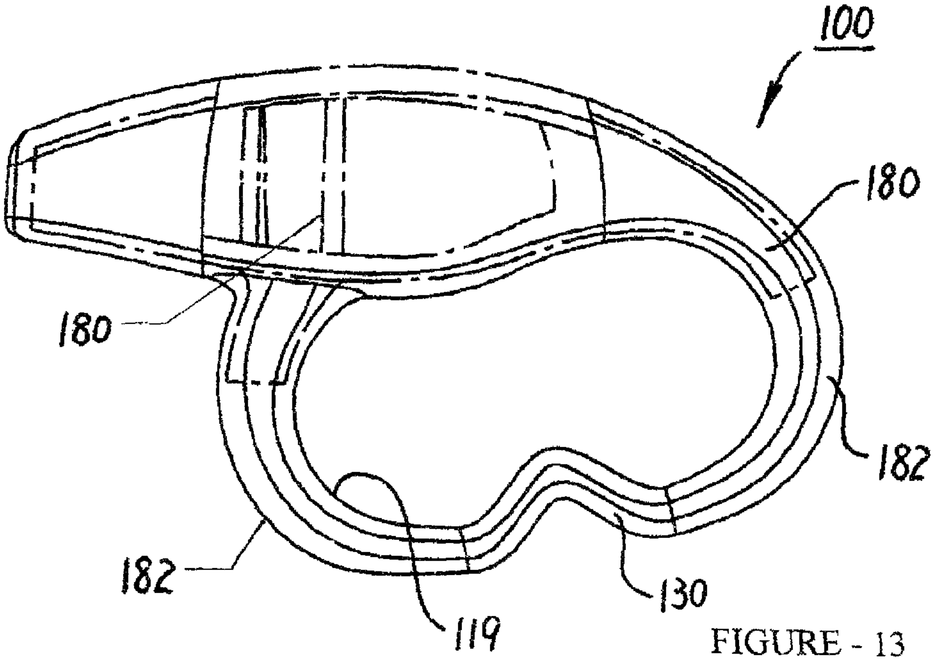
FIG. 13 is a schematic side elevational partial cut away view of the whistle showing the hard plastic components and the rubber overlay.

FIG. 14 shows the rubber overlay 182 portion of whistle 100 whereas FIG. 13 shows the hard plastic body core 180 together with the rubber overlay 182. The reader will note that finger grip 116 is mostly made of rubber overlay material 182. The interior 119 of finger sleeve 118 is completely made of elastomeric material which preferably is an elastomeric rubber overlay 182, as is V-spring 130.

Figure 15:
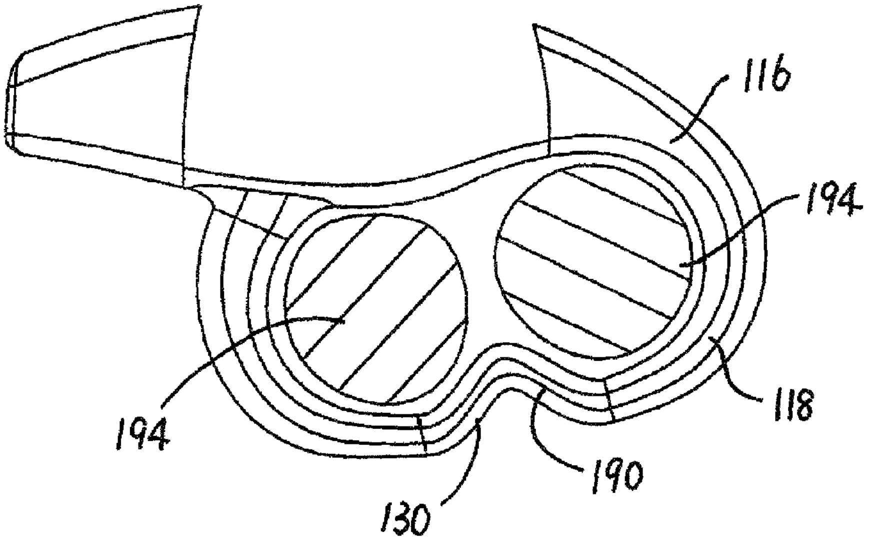
FIG. 15 is a schematic cross sectional side view of the whistle showing small fingers housed within the finger grip sleeve of the finger grip showing the V-spring in a normal position.
Figure 16:
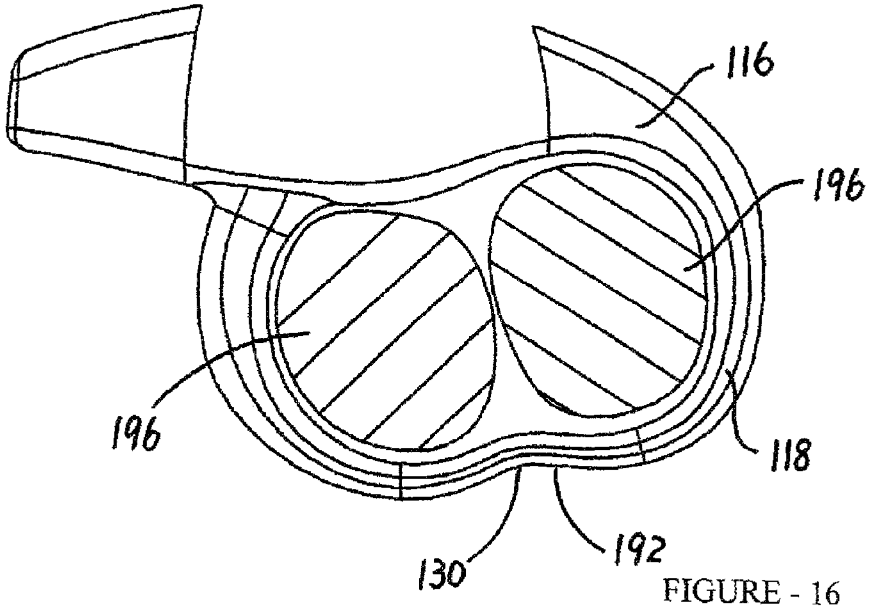
FIG. 16 is a side cross sectional schematic view of large fingers shown within the finger sleeve of the finger grip with the V-spring shown in the expanded position.

FIGS. 15 and 16 show schematically small fingers 194 and large fingers 196 inserted into finger sleeve 118 of finger grip 116. In FIG. 15 small fingers 194 are shown within finger sleeve 118 wherein V-spring 130 is in a normal position 190. Normal position 190 V-spring 130 may be slightly expanded to resiliently bias against the exterior of fingers 194 as shown in FIG. 15.

In FIG. 16 large fingers 196 are shown within finger sleeve 118 such that V-spring 130 is shown in the expanded position 192. In the expanded position 192, finger sleeve 118 can accommodate larger fingers as shown as large fingers 196 in FIG. 16 and continue to resiliently bias against the exterior of large fingers 196.

FIGS. 17, 18 and 19 show an alternate embodiment namely whistle 500 which includes almost all of the same components as whistle 100 with the addition of a right intake port 502 and a left intake port 504. Right intake port 502 and left intake port 504 allow port air to enter separately from inlet air entering inlet 501. Port air is naturally drawn in rather than blown in as is the case with inlet air entering inlet 501. Port air is drawn into right intake port 502 and left intake port 504 through a venturi or siphoning action which occurs by placing the air orifices 512 and 514 in close proximity to right air aperture 510 and left air aperture 511. Right air aperture 510 and left air aperture. 511 exit at right deflector 506 and left deflector 508 proximate right air orifice 512 and left air orifice 514 which communicate with right sound chamber 520 and left sound chamber 522.

Inlet 501 is divided into a right air passageway 550 and a left air passageway 552 and discharges inlet air into the sound box 503. The passageways 550 and 552 exhaust inlet air into the sound box 503 at air orifices 512 and 514. In practice it has been found that the use of the right intake port 502 and left intake port 504 creates a sound emanating from whistle 500 which more closely emulates the sound of the traditional pea-style whistle. In practice it is preferable to orient the air apertures 510 and 511 between the orifices and the exterior surface 551. In other words the air apertures 510 and 511 are closer to the exterior surface than the air orifices. The sound box includes deflectors 506 and 508 for deflecting sound forwardly, and the air orifices 512 and 514, and air apertures 510 and 511 are preferably located along the deflector.

Figure 20:
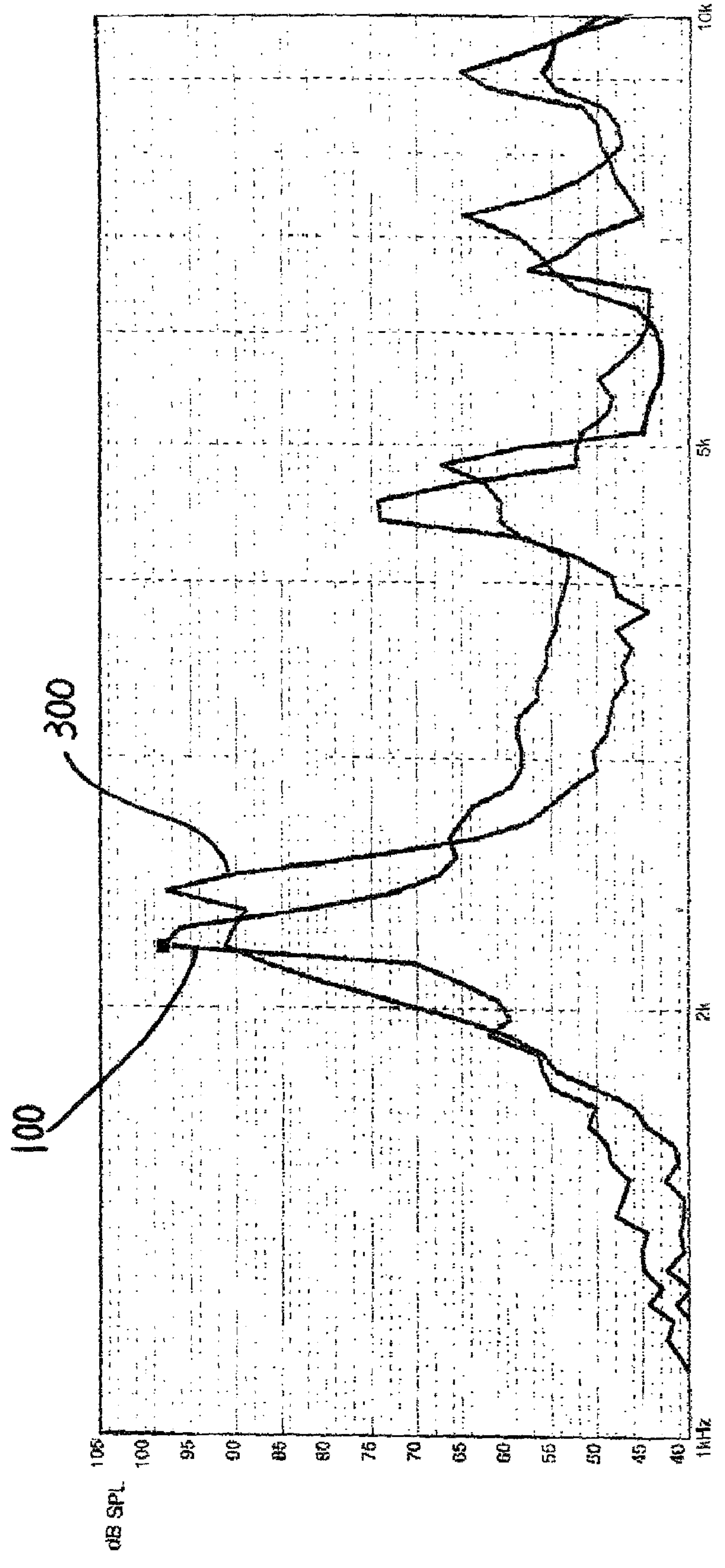
FIG. 20 is a graph depicting sound decibels on the Y-axis and frequency on the X-axis showing two frequency charts superimposed one on the other comparing a traditional ball whistle with the present whistle design.

Referring now to FIGS. 20 through to 25, which generally are charts, which show on the Y-axis decibel sound levels and on the X-axis frequency and/or time. FIG. 20 shows the sound profile of a traditional ball whistle 300 and the present whistle 100.

Figure 25:
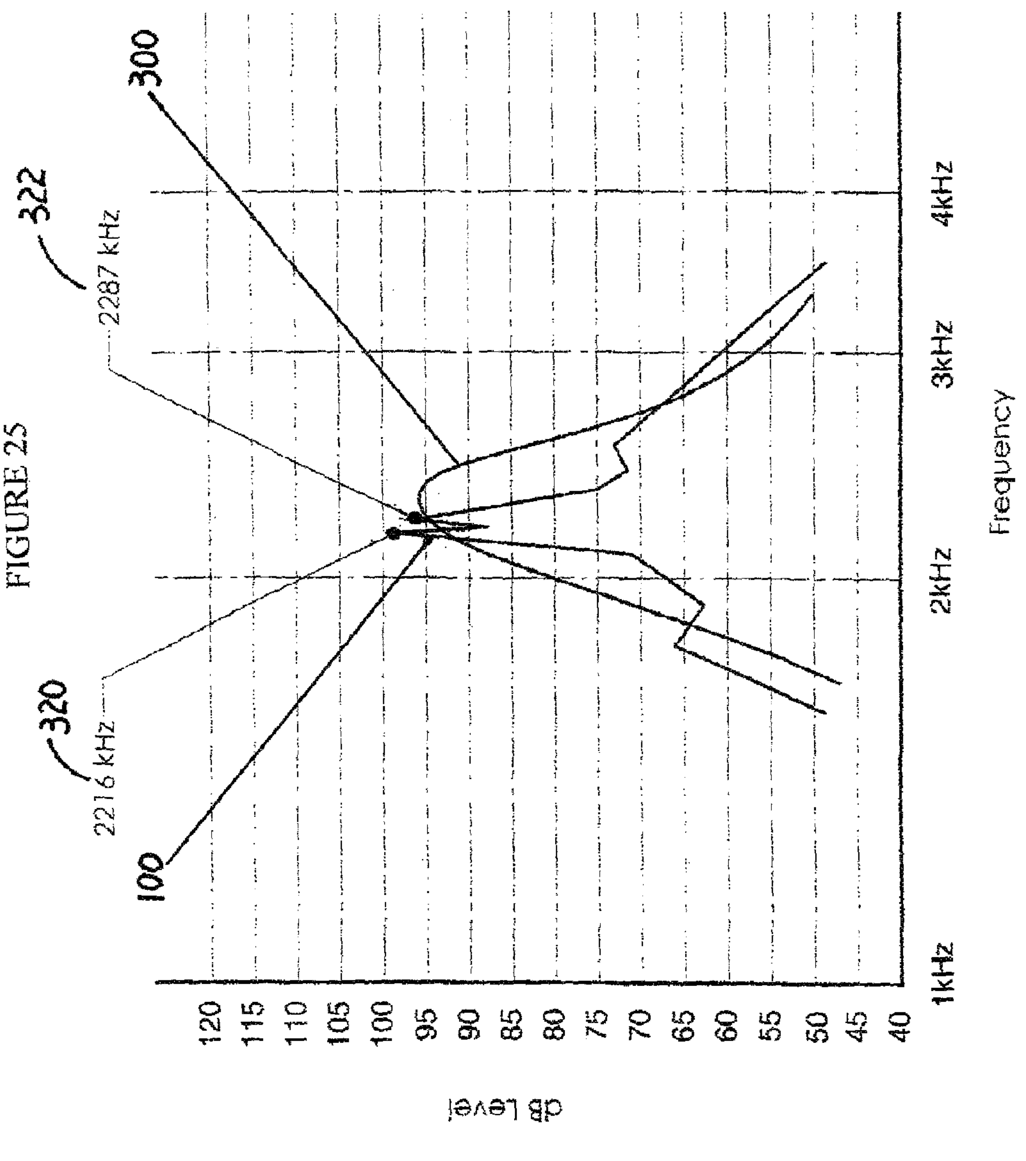
FIG. 25 is a schematic chart showing decibel levels on the Y-axis and frequency on the X-axis super imposing a traditional ball whistle and the present design whistle.

The present whistle 100 appears in FIG. 20 as having a single peak however in practice with a finer resolution of the measuring equipment in fact the peak which occurs at approximately 2250 hertz is actually a twin peak one having a peak at 2216 hertz and the other having a peak at 2287 hertz as depicted in FIG. 25.

These frequency peaks namely the 2216 hertz peak shown as 320 and the 2287 hertz peak shown as 322 create a periodic pulse frequency of 71 hertz. The peak principal frequency of 2216 hertz corresponds to one of the sound chambers and the peak principal frequency of 2287 hertz corresponds to the other sound chamber in whistle 100. The peak principal frequency difference causes interference of these two frequencies resonating from the two sound chambers which creates the periodic pulse frequency which preferably is in the range of 10 to 100 hertz in order to provide a pulsating sound emulating the traditional pea-type whistle.

Figure 21:
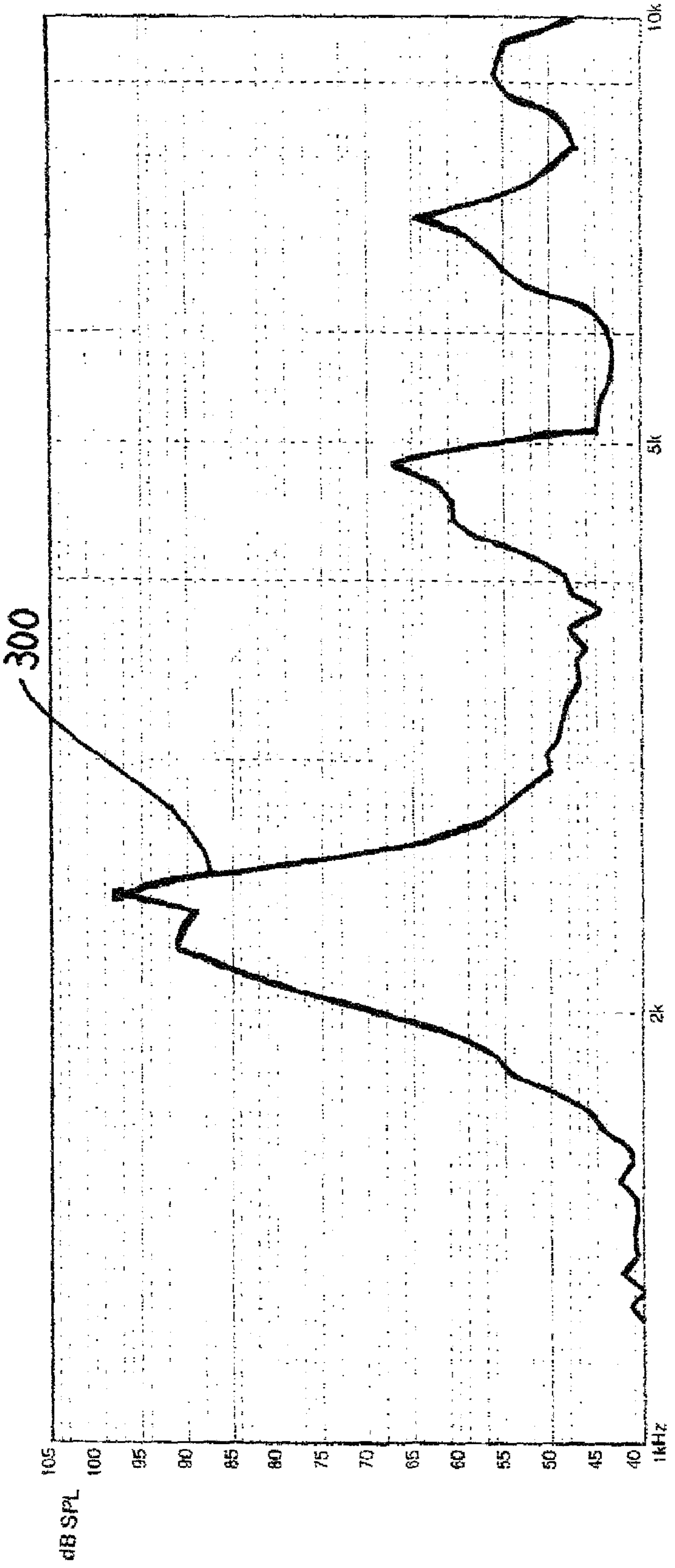
FIG. 21 is a chart showing decibels on the Y-axis and frequency on the X-axis for a traditional ball whistle.
Figure 22:
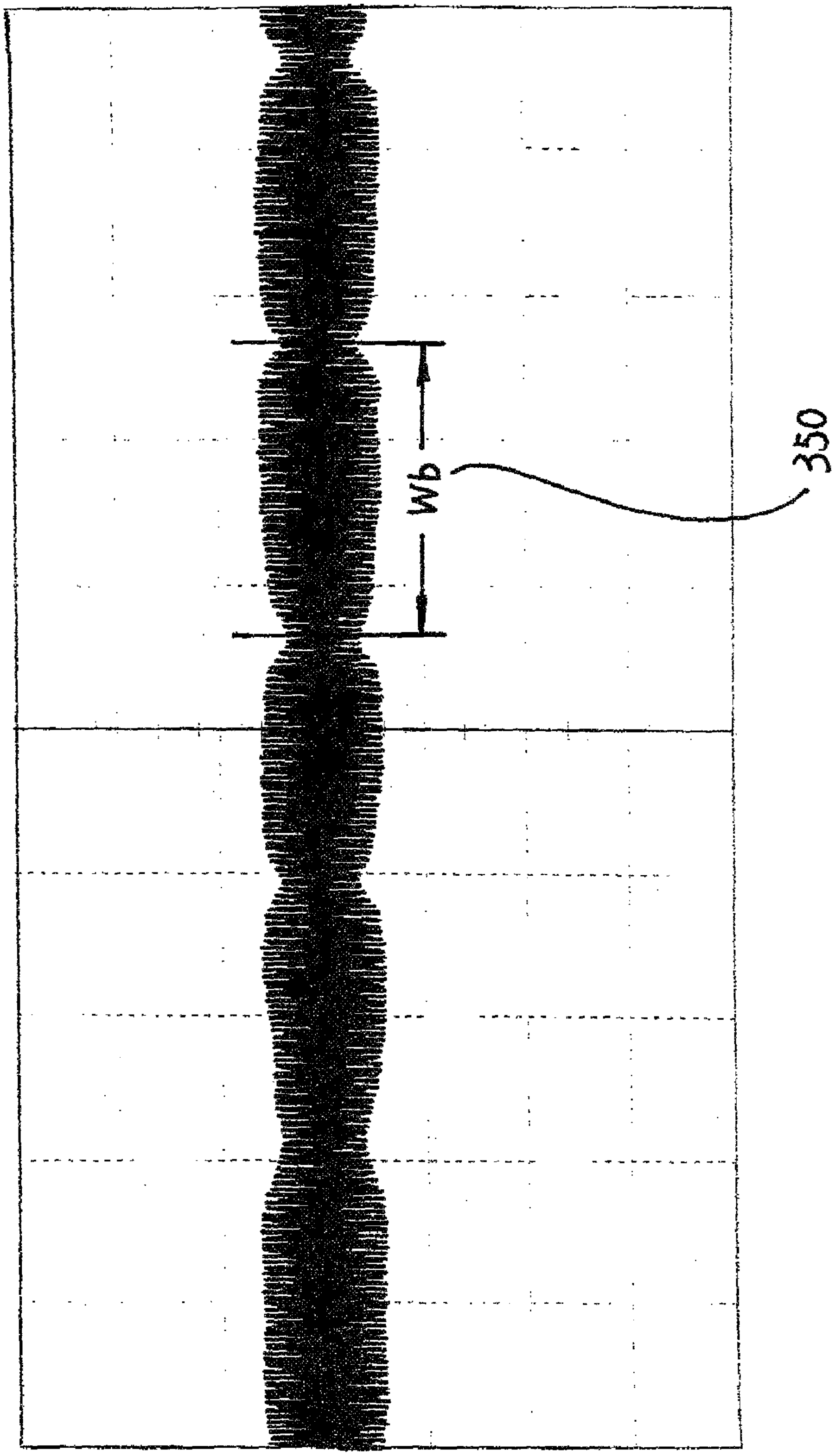
FIG. 22 is a graph depicting amplitude on the Y-axis and time along the X-axis showing the periodic pulse frequency of a traditional ball whistle, which is graphed in FIG. 21.

Referring to FIG. 21 which depicts decibels in the Y-axis and frequency on the X-axis of a traditional ball whistle 300 and FIG. 22 which shows the corresponding periodic pulse period WB as shown as 350 in FIG. 22. WB shown as 350 the pulse period in FIG. 22 is measured at 50 hertz (wb=50 hertz) which are the measurements taken from a traditional pea-style whistle.

Figure 23:
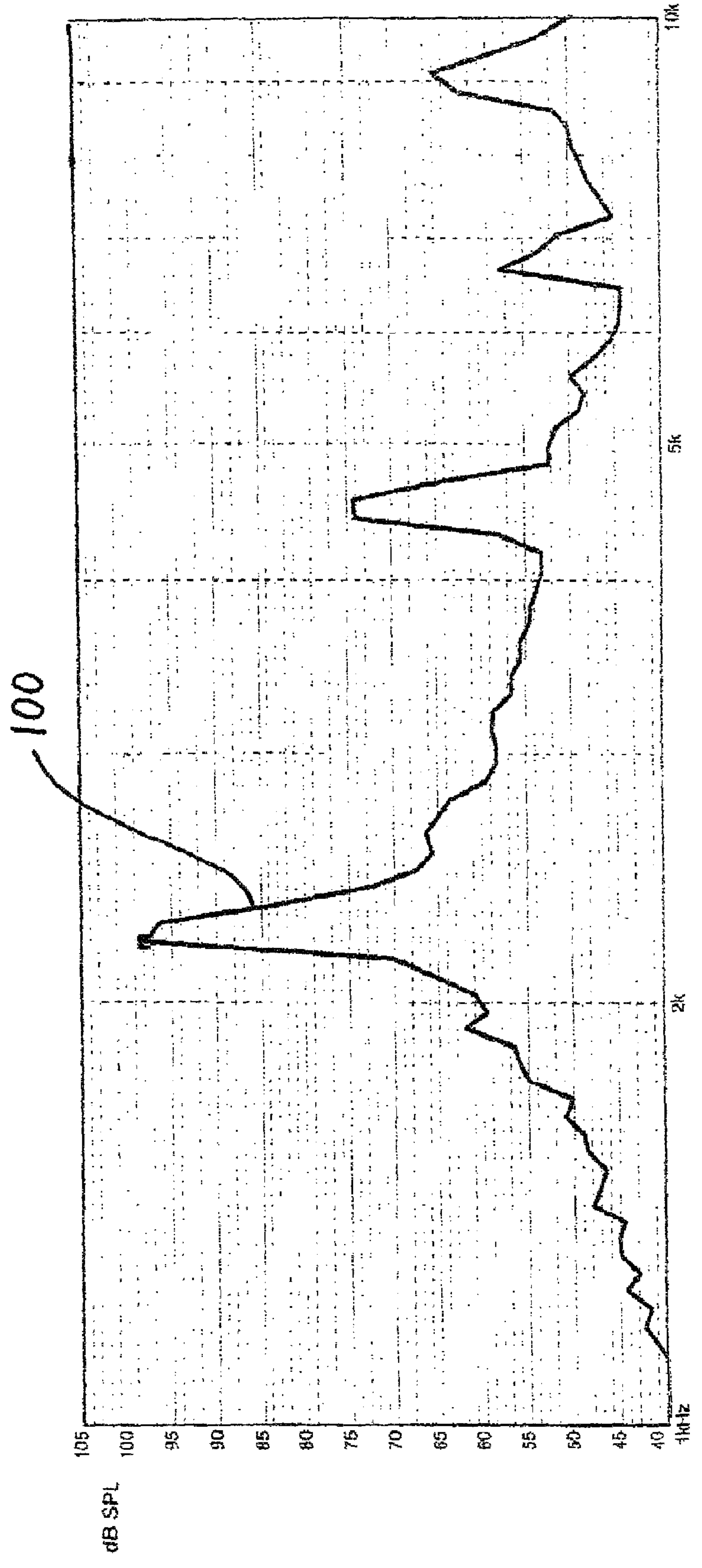
FIG. 23 is a graph depicting decibels on the Y-axis and frequency on the X-axis showing the frequency fingerprint of the whistle made in accordance with the present design.
Figure 24:
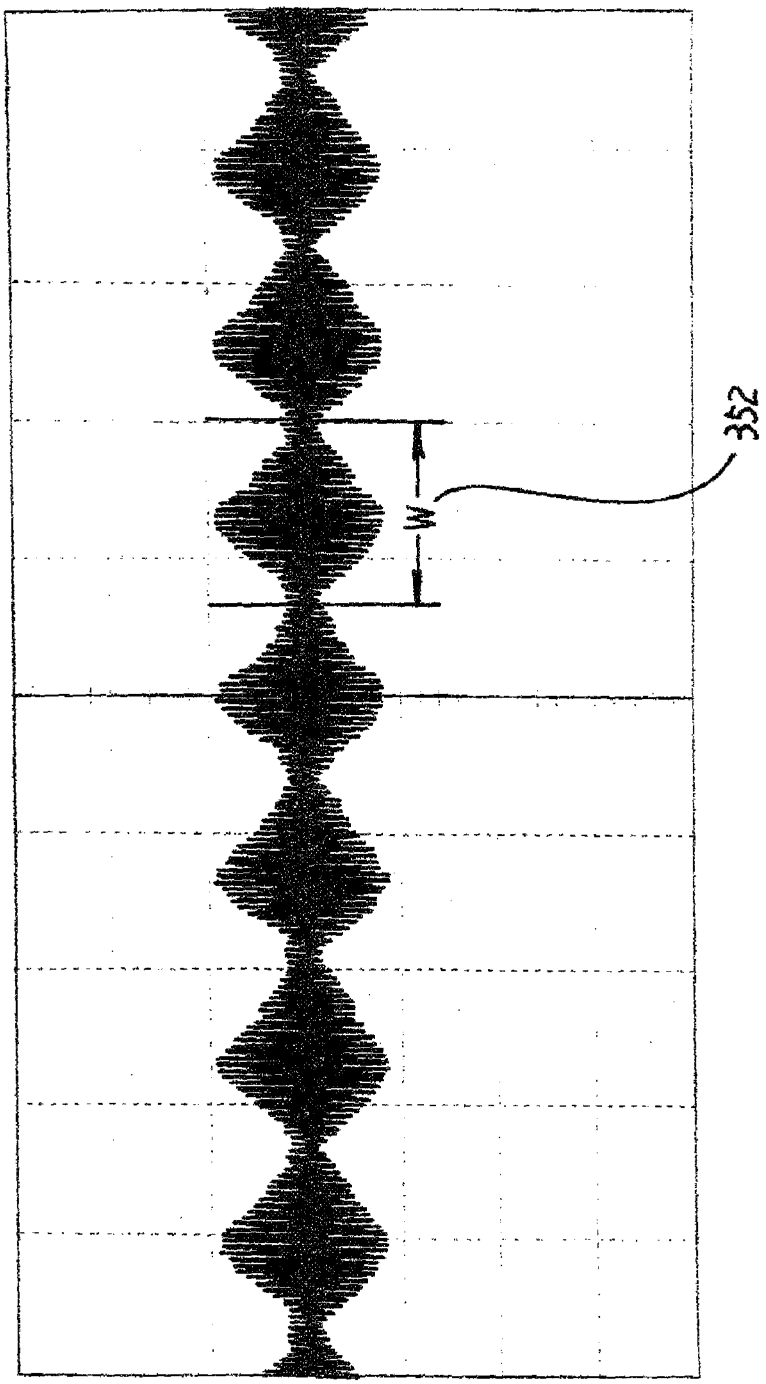
FIG. 24 is a chart showing amplitude on the Y axis and time on the X-axis showing the periodic pulse frequency of the present design depicted in graph form in FIG. 23.

FIG. 23 depicts decibels on the Y-axis and frequency on the X-axis and shows a peak frequency of approximately 2216 hertz. However as described above in FIG. 25 the peak is actually a twin peak having two peak frequencies of 2216 hertz and 2287 hertz. The pulse period W for the present whistle 100 is shown in FIG. 24 and is measured at 71 hertz (W=71 hertz) which is the periodic pulse frequency due to the interactions of the principle frequencies of the two sound chambers.

The reader will note that in FIG. 20 there are other smaller peaks to the right of the peak principle frequency which are called harmonic peak frequencies and/or simply harmonic frequencies which add very little to the sound being heard from the whistle.

I claim:

1. A whistle for producing resonant frequencies comprising:

a) a body which includes a front portion including a mouth piece with an inlet, and includes a rear portion including at least two sound chambers, b) the front portion including at least two air passageways each receiving inlet air at the inlet and discharging inlet air at an orifice, c) the body further includes a central portion separating the front portion from the rear portion, the central portion including at least two exhaust ports each for discharging air and sound and for communicating inlet air from the orifice to the sound chamber, d) wherein the exhaust ports include deflectors in horizontally opposed relationship to the sound chambers for deflecting sound and air, e) wherein the front portion includes additional air intake ports for communicating port air into the exhaust port at an air aperture such that the orifices and air apertures discharge air along the deflector.

2. The whistle claimed in claim 1 wherein the air apertures and orifices are located in side by side relationship along the deflector.

3. The whistle claimed in claim 2 wherein the air intake ports drawing in port air independently of the inlet.

4. The whistle claimed in claim 2 wherein the orifices discharging inlet air independently of the air apertures discharging port air.

5. The whistle claimed in claim 2 wherein each intake port is located in the front portion of the body between the inlet and the deflector.

6. The whistle claimed in claim 1 wherein the two sound chambers are dimensioned to create peak principal frequencies which interactively produce a pulsating sound having a periodic pulse frequency of less than 100 hertz.

7. The whistle claimed in claim 1 wherein the port air is drawn into exhaust port by siphoning action from the adjacent flow of inlet air exiting the orifice.

8. The whistle claimed in claim 1 wherein the two sound chambers are dimensioned to create peak principal frequencies which interactively produce a pulsating sound having a periodic pulse frequency of between 10 to 100 hertz.

9. The whistle claimed in claim 8 wherein two sound chambers are dimensioned to produce a peak principal frequency difference of between 10 hertz to 100 hertz and wherein the principal frequency is selected between 2000 and 2400 hertz.

10. A whistle for producing resonant frequencies comprising:

a) a body includes a mouth piece having an inlet, at least two sound chambers to which inlet air is blown from the inlet, b) air passageways for communicating inlet air from the inlet to the sound chambers;

c) the body further includes at least two exhaust ports in communication with the sound chambers for discharging air and sound;

d) a finger grip which includes a contiguous finger sleeve integrally connected to the body for receiving and surrounding two fingers therein;

e) the finger sleeve includes a V shaped expansion spring for accommodating variations in finger size and gripping the fingers within the finger sleeve, the V shaped expansion spring moveable between a normal V position and an expanded position wherein the V shaped spring is substantially flat.

11. The whistle claimed in claim 10 wherein one leg of the V spring contacting one finger and the other leg of the V contacting the other finger.

12. The whistle claimed in claim 10 wherein the V shaped expansion spring made of elastomeric material.

13. The whistle claimed in claim 10 wherein an interior of the contiguous finger sleeve is made of elastomeric material.

14. A whistle for producing resonant frequencies comprising:

a) a body includes a mouth piece having an inlet, at least two sound chambers to which inlet air is blown from the inlet;

b) air passageways for communicating inlet air from the inlet to the sound box and sound chambers;

c) the body further includes at least two exhaust ports in communication with the sound chambers for discharging air and sound;

d) wherein the two sound chambers are dimensioned to create peak principal frequencies which interactively produce a pulsating sound having a periodic pulse frequency of less than 0.1 KHz; and e) wherein two sound chambers are dimensioned to produce a pulsating sound having a periodic pulse frequency of between 0.010 KHz to 0.90 KHz and wherein the principal frequency is selected between 2.0 KHz and 2.4 KHz.

* * * * *